United States Patent
Dunn et al.

(10) Patent No.: US 6,665,382 B2
(45) Date of Patent: Dec. 16, 2003

(54) METHOD AND APPARATUS FOR WIRELESS COMMUNICATION OF DIGITAL DATA

(75) Inventors: William A. Dunn, Norcross, GA (US); Eric C. Whittaker, Santa Barbara, CA (US)

(73) Assignee: PocketMail Inc., Sydney (AU)

( * ) Notice: Subject to any disclaimer, the term of this patent is extended or adjusted under 35 U.S.C. 154(b) by 535 days.

(21) Appl. No.: 09/733,861

(22) Filed: Dec. 8, 2000

(65) Prior Publication Data

US 2001/0040944 A1 Nov. 15, 2001

Related U.S. Application Data

(60) Provisional application No. 60/172,854, filed on Dec. 10, 1999.

(51) Int. Cl.⁷ ............................................. H04M 11/00
(52) U.S. Cl. ................................................. 379/93.32
(58) Field of Search ..................... 379/93.32, 93.31, 379/93.28, 93.34, 90.01, 93.01; 375/222; 455/403

(56) References Cited

U.S. PATENT DOCUMENTS 5,796,808 A * 8/1998 Scott et al. ............... 379/93.31
5,852,631 A * 12/1998 Scott ........................ 379/93.32

* cited by examiner

*Primary Examiner*—Stella Woo
(74) *Attorney, Agent, or Firm*—Gray Cary Ware & Friedenrich

(57) ABSTRACT

A method and apparatus for establishing a connection between a server and a remote device over a communication network. Data transmission is attempted at a first carrier frequency and bit rate. If transmission is unsuccessful, the bit rate is lowered. If transmission remains unsuccessful, the carrier frequency is changed to a second carrier frequency. As data transmission continues, the bit rate may be interactively increased or decreased in order to maximize data transfer throughput.

20 Claims, 4 Drawing Sheets

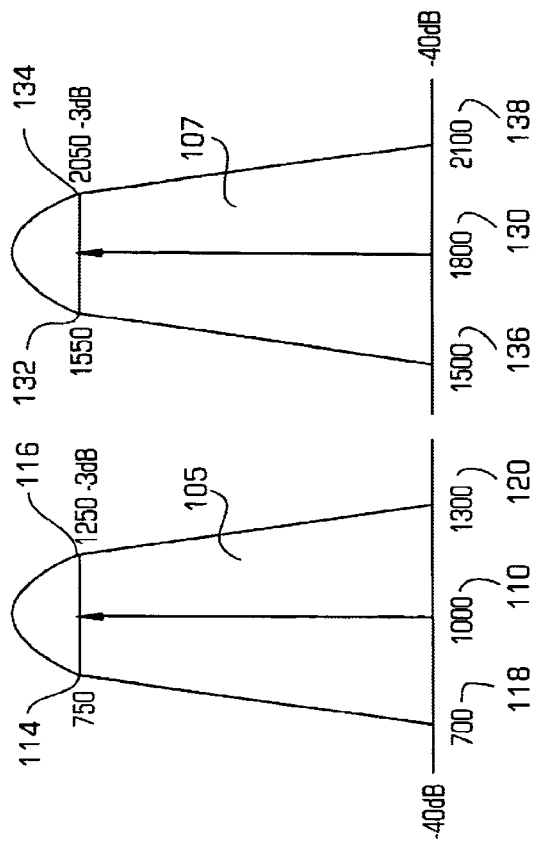
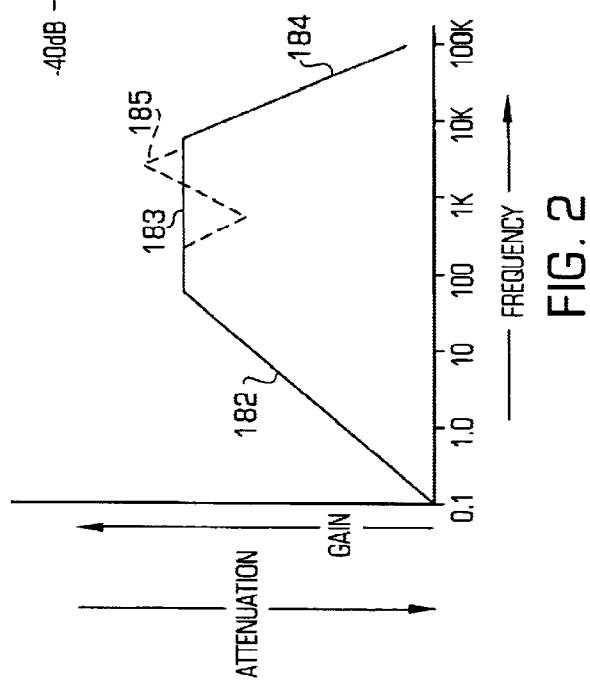

METHOD AND APPARATUS FOR WIRELESS COMMUNICATION OF DIGITAL DATA

CROSS-REFERENCES TO RELATED APPLICATIONS

This application claims the benefit of U.S. Provisional Application No. 60/172,854, filed Dec. 10, 1999, the disclosure including appendices of which is incorporated by reference.

BACKGROUND OF THE INVENTION

The present invention generally relates to communication protocols and more particularly to a communication protocol for establishing a connection and data transferring between a server and a remote device over a communication network using an acoustically coupled modem.

E-mail has become ubiquitous in our society today. It spans the personal and professional world, and many users have e-mail accounts for both work and home. People use it to conduct business, and keep in touch with loved ones. For some it has become more useful than the telephone and post office combined. It is considered the "killer app" of the Internet. Embodiments of this invention bring email to users who otherwise might not have access.

But for all its virtues, e-mail typically requires a computer with an Internet connection to send and receive messages. This limits the availability of e-mail to the business or pleasure traveler, or for those in locations with no Internet access. Laptop computers provide a solution for some, but they are expensive, costing in the thousands of dollars. While they may accompany some business travelers, they tend to be awkward and bulky and often are left behind, and are certainly of limited use on vacation. Also, while the Internet may be reached from many locations, it is not universal, and toll charges may apply. A simple phone line connection is much easier to access.

Palmtop computers, such as those made by Palm, Inc., provide an excellent portable computing device for both corporate and vacation travelers. Other PDAs (Personal Digital Assistants) may be used. Alternately a portable stand-alone device can be configured to send and receive messages. For example, a portable device having a keyboard for data entry, and a screen for viewing text and possibly images could be used.

What is needed therefore, is a method and apparatus for sending and receiving e-mail on a palmtop or other device using a phone line.

SUMMARY OF THE INVENTION

A method and apparatus for establishing a connection between a server and a remote device over a communication network is provided by embodiments of the present invention. Data transmission is attempted at a first carrier frequency and bit rate. If transmission is unsuccessful, the bit rate is lowered. In one embodiment the bit rate is lowered by changing the modulation type. If transmission remains unsuccessful, the carrier frequency is changed to a second carrier frequency. As data transmission continues, the bit rate may be interactively increased or decreased in order to maximize data transfer throughput.

A connection is first attempted using the highest carrier frequency and the highest bit rate supported by the specific embodiment. If a connection is not made, or errors occur, the remote device will drop the bit rate. If a connection is still not made, the bit rate is cut again. If a connection remains illusive, the carrier frequency is changed.

Various phones perform differently with different carrier frequencies. For example, older cellular phones work better with a lower carrier, while analog phones prefer with a higher carrier. New mobile digital phones have improved overall frequency response, and work well with both.

Once a connection is made, the telephone network channel characteristics may change. To account for this, and to optimize the data throughput, the bit rate may be interactively changed by varying the modulation scheme. For example, if QPSK is being used, and no errors occur for a number of data transfers, the modulation type is changed to 8PSK. If the channel changes such that this modulation cannot be sustained, it is dropped back to QPSK, and data transfer resumes.

The data transfers are used by one embodiment of the present invention to send and receive e-mail messages. Alternately, other types of data for other applications may be sent using similar embodiments.

A better understanding of the nature and advantages of the present invention may be gained with reference to the following detailed description and the accompanying drawings.

BRIEF DESCRIPTION OF THE DRAWINGS

FIG. 2 is a Bode plot showing the general frequency response of a telephone network data channel;

FIG. 3 shows the frequency response characteristics of the filters used in shaping the transmitted data spectrum by one embodiment of the present invention;

DESCRIPTION OF THE SPECIFIC EMBODIMENTS

Figure 1:
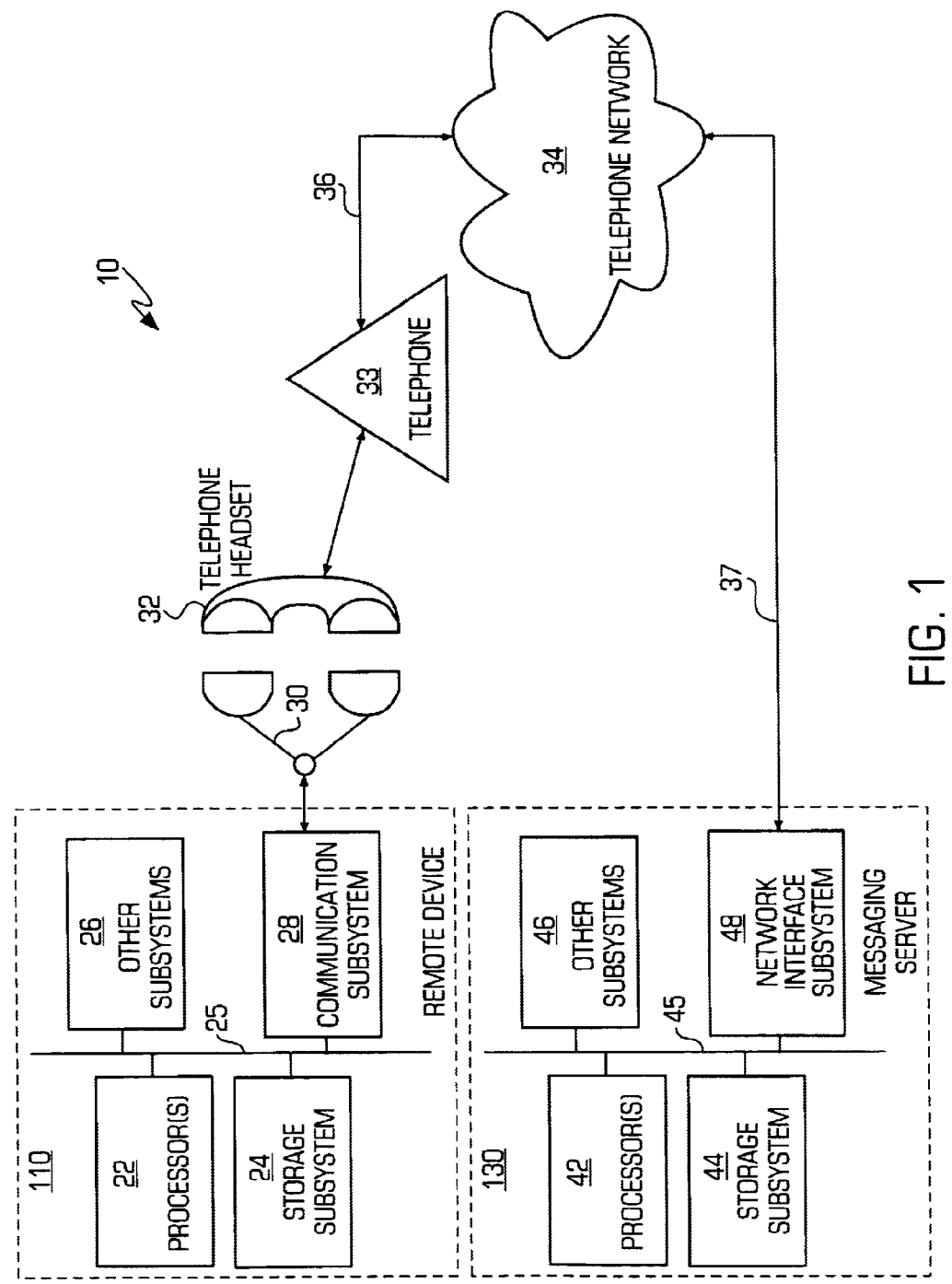
FIG. 1 shows a simplified block diagram of a representative embodiment of a messaging system, according to one exemplary embodiment of present invention.

FIG. 1 shows a simplified block diagram of a specific embodiment of a messaging system embodying the present invention. The messaging system 10 includes a remote device 110 with attached modem coupling apparatus 30, a telephone handset 32 attached to a telephone 33 and telephone network 34, and a messaging server 130. The telephone network 34 may include land lines, e.g., copper wire, coaxial cables, fiber, and air links, e.g., satellites and cellular phone transceivers, and microwave towers. Examples of the telephone 33 and accompanying handset include a desk unit, traditional rotary unit, public telephone box, analog cellular phone, or digital mobile phone. The remote device 110 includes one or more processors 22, a storage subsystem 24 which may further includes RAM and ROM, bus 25, and a communication subsystem 28 which further includes an acoustically coupled modem which is connected to the modem coupling apparatus 30. Remote device 110 may be a palmtop computer, stand-alone device, or any other such device. The messaging server 130 includes one or more processors 42, a storage subsystem 44 which may include RAM, ROM and hard disks, bus 45, and a network interface subsystem 48. On the remote device 110, the communication protocol software may be stored in the storage subsystem 24 and executed by the processor(s) 22 and communication subsystem 28. The system is more fully detailed in U.S. patent application Ser. No. 09/218,911, filed Dec. 22, 1998, entitled "SYSTEM AND METHOD FOR COMMUNICATING ELECTRONIC MESSAGES OVER A TELEPHONE NETWORK USING ACOUSTICAL COUPLING," by Beerman, et. al, and U.S. patent application Ser. No. 09/219,109, filed Dec. 22, 1998, entitled "MESSAGING COMMUNICATION PROTOCOL," by Chen, et. al, which are herein incorporated by reference in their entirety for all purposes. On the messaging server 130 the communication protocol software may be stored in the storage subsystem 44 and executed by the processor(s) 42 and network interface subsystem 48, also other subsystems as necessary to support the communication.

The communication link between the remote device and messaging server is through the communication subsystem 28, modem coupling apparatus 30, telephone handset 32, telephone 33, telephone connection 36, telephone network 34, and network interface subsystem 48. The telephone headset 32 and telephone 33 may be one unit. Telephone connection 36 may be analog or digital. Telephone connection 36 may be wired, such as with copper or fiber optic cable, or wireless, using standards such as DECT (Digital Enhanced Cordless Telecommunications), GSM (Global System for Mobile), CDMA (Code Division Multiple Access), TDMA (Time Division Multiple Access), or Bluetooth. The modem coupling apparatus 30 may be combined with the remote device, or it may be a separate unit. Modem coupling apparatus 30 may be arranged to hold the remote device 110, for example where the remote device 110 is a PDA. Also it may be arranged to fit a standard telephone headset, cellular phone, digital mobile phone, or any other type of phone.

The messaging system 10 in FIG. 1 provides an excellent way to send and retrieve e-mail messages while at a remote site, or even work or home. For example, a user with a PDA can attach the PDA to a modem coupling apparatus 30, dial a phone number to connect to the messaging server 130, hold the telephone headset 32 to the modem coupling apparatus 30, and receive e-mail from, and send e-mail messages to the messaging server 130. Messages sent by others to a remote user are stored in the storage subsystem 44 of the messaging server 130, until the remote user makes a connection. E-mail written on the remote device is stored in storage subsystem 24 of the remote device 110, also until a connection with the messaging server 130 is made.

Data signals are sent from communication subsystem 28 in remote device 110 to the network interface subsystem 48 in messaging subsystem 130, and sent to communication subsystem 28 in remote device 110 from the network interface subsystem 48 in messaging subsystem 130. The signals may be contain e-mail information, or any other type of data information. Along the path in each direction data signals are corrupted and distorted, and noise is added at every point. The connection between the remote device 110 and modem coupling apparatus 30 is generally quite excellent, and may consist of a serial port or the like. The modem coupling apparatus 30 to telephone headset 32 interface is well designed in embodiments of the present invention, but may be a source of limited interference from acoustic noise, electromagnetic coupling, and the like.

Older cellular phones tend to have poor high frequency characteristics, and work better with a lower carrier frequency. Newer cellular or digital mobile phones tend to work over a broader range. Analog phones may have poor low frequency characteristics, and work better with higher carrier frequencies.

The major source of distortion and noise is the telephone network 34. In many locations, the infrastructure was designed to handle only acoustic signals, specifically voice, and not data signals. Therefore, the data signals must be designed in such a way as to be sent and received with a minimum of distortion. Copper wiring is particularly susceptible to this, as is wireless, but so is fiber optic cabling. Also, particularly where copper wiring is used, signals on adjacent wires may interfere with each other, thus adding noise. Also, the path through the telephone network may involve more than one wiring system with different characteristics, it may use satellite transmission, or convert signals from analog form to digital, and from digital to analog. Part of the path may be wireless, and parts may be wired.

In general, the telephone network 34 will have a frequency response shaped like a bandpass filter. Specifically, low frequencies will be attenuated, for example, DC or 0 Hz will not be passed by the telephone network at all. Beginning at 60 Hz up to a several hundred Hz, signals will be passed, and above a higher frequency, for example 4 kHz, frequency components will again be attenuated.

FIG. 2 is a Bode plot of the frequency response for a telephone network channel. The y axis is the channel gain, the x is frequency. This example is not specific to any type of channel, and is only illustrative of the general response of some of these types of networks. Frequencies above and below cutoff frequencies, as indicated by lines 182 and 184, are attenuated, and those between are generally passed, as indicated by line 183. But the frequency range indicated by line 183 is not actually flat. For example, it may dip, or have peaks as shown by dashed line 185. More specifically, the gain may increase and decrease as a function of frequency in the range labeled 183. Furthermore, the response may change with time. Furthermore, a "dip" may become more pronounced, to the point where the channel does not pass a signal component at that frequency.

If a carrier frequency is at a point in the spectrum where the channel has excessive attenuation, the signal will not be received. Also, the carrier frequency may be outside of the band pass range, and the signal would therefore be attenuated. Unfortunately, this cannot be anticipated. Again, the phone itself also may tend to pass or attenuate various carrier frequencies differently. Accordingly, one embodiment of the present invention sends data at a first carrier frequency, and if it is not received, the carrier frequency is changed to a second carrier frequency, and data transmission is attempted again.

FIG. 3 discloses a specific embodiment of the narrow band modem spectra of the present invention. FIG. 3 shows two band pass filters 105 and 107 in the acoustical frequency spectrum range used to shape the spectra. The first band pass filter 105 is centered on frequency 1000 Hz 110 with the bandwidth of 500 Hz, i.e., the −3 dB points being at 750 Hz 114 and 1250 Hz 116. The −40 dB points for the first band pass filter 105 are at 700 Hz 118 and at 1300 Hz 120. The second band pass filter 107 is centered at 1800 Hz 130 and has a bandwidth of 500 Hz, i.e., the −3 dB points are at 1550 Hz 132 and at 2050 Hz 134. The 40 dB points for the second band pass filter 107 are at 1500 Hz 136 and at 2100 Hz 138. The center frequencies, bandwidths and shape of the two band pass filters 105, 107 given are mere illustrations and one of ordinary skill in the art would recognize other variations, modifications, and alternatives.

In a specific embodiment the carrier frequency and bandwidth of the narrow band modem is selected so that communication is possible when the telephone handset 32 is one with a high degree of voice compression, for example, 8 kilo bits per second (Kbps), 9.6 Kbps, or 13 Kbps with compression ratios of 8, 6.666 and 5 respectively, where 64 Kbps is a typical voice rate for a digital telephone network. Examples of such voice compression may be found on the type of telephone handset referred to as a digital wireless phone used on such networks as GSM in Europe or Sprint PCS digital network. In this embodiment the two center frequencies are selected to operate on a plurality of digital networks where one frequency works on one network and the other frequency works on another network, and the specific embodiment chooses the proper one for the given remote device. In another embodiment the two frequencies may work on the same network with one having better performance than the other and the better performing frequency is selected. In yet another embodiment there may be a plurality of different remote devices on the same network using a plurality of different frequencies. The functions described by the invention may be used on more than two frequencies and should not be limited by the description of the specific embodiments given. For example, in one embodiment of the present invention, three frequencies are used. Alternately, in other embodiments, four or more frequencies are used.

In a specific embodiment of the present invention, the data is transferred over the first band pass filter 105 or the second band pass filter 107.

Data sent through band pass filter 105 will typically have a carrier frequency of 1000 Hz. This frequency is referred to as the carrier frequency. Data is encoded by modulating the carrier by shifting its phase. For example, the phase may be shifted −180 degrees or +180 degrees. If two phase shifts are used, as in this example, the data is in BPSK (Biphase Shift Keying) format. Alternately, four phase shifts may be possible, such as −180, −90,+90, and +180 degrees. This is referred to as QPSK (Quadrature Phase Shift Keying). Also, 8 phase shifts may be possible, in 45 degree increments, as in 8PSK (8-state Phase Shift Keying). This phase shifting will occur at a rate referred to as the symbol rate.

The use of a higher modulation type has the advantage of being able to convey more information at the same data rate as the use of a lower modulation type. For example, QPSK contains twice the information per symbol as BPSK, and 8PSK has three times the information content as BPSK. Stated another way, BPSK conveys one, QPSK conveys two, and 8PSK conveys three bits per symbol. The number of bits per symbol times the symbol rate yields the bit rate.

But receiving 8PSK is more difficult than receiving BPSK, since proper decoding requires deciding which of 8 phase shifts occurred, if any, whereas decoding BPSK simply requires deciding between one of two. As an example, it is more difficult to determine if a phase shift was 45 or 90 degrees than to determine if it was −180 or +180. This means for noisy environments, 8PSK may not be practical, and QPSK, or even BPSK must be used.

One embodiment of the present invention seeks to optimize the bit rate by attempting to send and receive signals using 8PSK. If data communication is poor or not possible, the symbol modulation type is reduced to QPSK. If difficulties are still encountered, the modulation type is dropped again to BPSK.

Another embodiment of the present invention uses this concept of changing the modulation type in conjunction with changing the carrier frequency as discussed above.

One embodiment of the present invention uses a symbol rate of 500 symbols per second. That is, up to 500 phase changes may occur each second. This number is simply illustrative of one specific embodiment. Other symbol rates may be used, such as 400 or 600 symbols per second. As the modulation type and carrier frequency change, the symbol rate may stay constant. Alternately, the symbol rate may change also. In other embodiments, the symbol rate and the modulation type change, and in others the symbol rate and carrier frequency are varied until a connection is made. Only the symbol rate changes in other embodiments, while the carrier and modulation type remain constant.

Changing the phase of the carrier 500 times a second has the effect of spreading the spectrum of the data by 500 Hz. In other words, there is dispersion of the carrier. For example, a 1000 Hz carrier with no data transitions appears as a single 1000 Hz tone. In the frequency domain, this appears as a spike at 1000 Hz. If phase shifts occur at 500 Hz, the spectrum spreads to cover 750 Hz to 1250 Hz. This is why in FIG. 3, a band pass filter having 3 dB cutoff points of 750 and 1250 Hz is used. Similarly, the other band pass filter in FIG. 3 has 3 dB cutoff points at 1550 and 2050 Hz; these are also 500 Hz apart. To ensure an even spectrum over these ranges, a scrambler and descrambler may be used by the remote device 110 and messaging server 130 in some embodiments of the present invention.

Figure 4:
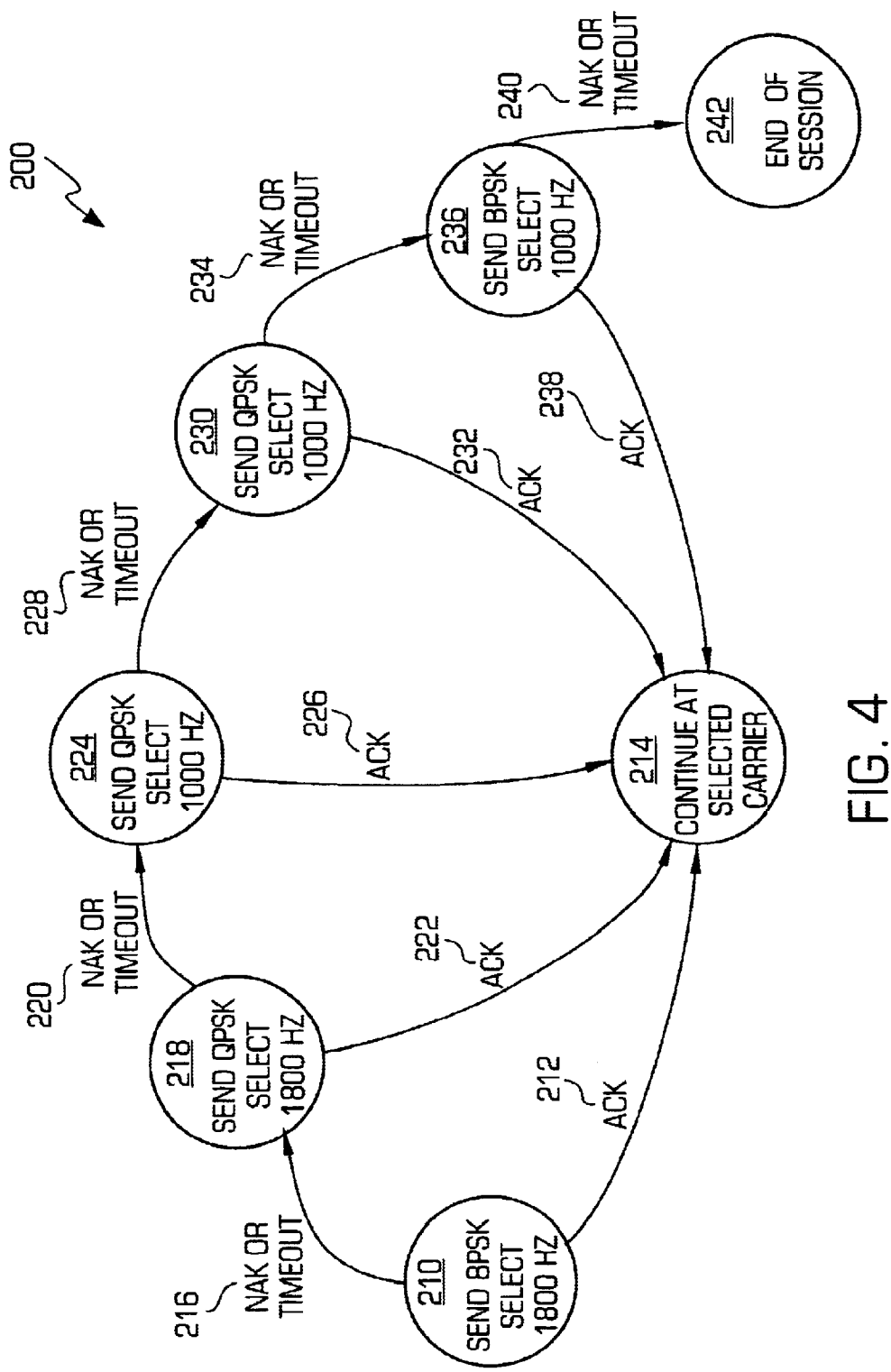
FIG. 4 illustrates a state machine used while making a connection from a remote device to a messaging server by one embodiment of the present invention.

FIG. 4 shows a simplified state diagram for the connection establishment phase of one such exemplary embodiment of the present invention. The specific values shown herein are strictly illustrative, and do not limit the appended claims. The connection establishment phase is when the remote device 110 establishes a data connection to the messaging server 130 through a telephone network 34. The remote device 110 sends a setup information item using 8PSK modulation and carrier frequency 1800 Hz 130 with bandwidth spectrum 107. This is state 210 in FIG. 4. This is the highest data rate and the largest number of bits per symbol supported by one exemplary embodiment. Other embodiments may have higher symbol rates, and more bits per symbol. Upon receiving the setup information item, the messaging server 130 may find no errors and sends an acknowledgment information item (ACK) 212 back to the remote device 110 to indicate that the connection has been established, that is, the state machine moves into state 214. In state 214, the data transfer phase begins at the selected carrier frequency, for example, from state 210 the selected carrier frequency is 1800 Hz. If the messaging server 130 finds errors in the setup information packet sent to it by the remote device, the messaging server 130 returns a non-acknowledgment information item (NAK) 216. In another embodiment, the messaging server may not return anything to the remote device 110, whereupon the remote device 110 timeouts after not receiving a response to the initial setup information item within a predetermined time. This may also occur if the data is corrupted beyond recognition. Thus, a NAK or timeout 216 causes a change in state from 210 to state 218. In state 218, the remote device 110 resends the setup information item using carrier frequency 1800 Hz and QPSK modulation. If a NAK or timeout 220 is again received, the remote device 110 resends the setup information packet using QPSK and center frequency 1000 Hz., i.e., state 224. If there is again a NAK or timeout 228, state 224 transitions to state 230, where the setup information packet is resent, again, using QPSK and a center frequency of 1000 Hz. If another NAK or timeout 234 is returned to the remote device 110, the remote device 110 resends the setup information packet using BPSK modulation and a center frequency of 1000 Hz, state 236. Finally, if 5 NAKs or timeouts have been consecutively received 240, the remote device 110 ends the connection session, state 242. At each of the previous states 210, 218, 224, 230, 236, if an ACK 212, 222, 226, 232, 238, is received, the state machine transitions into state 214. Other embodiments of the present invention require two or more ACKs before a connection is established. For example, three ACKs may be required before a connection is established. Alternately, a ACK may be required periodically to ensure that the connection has remained viable.

Figure 5:
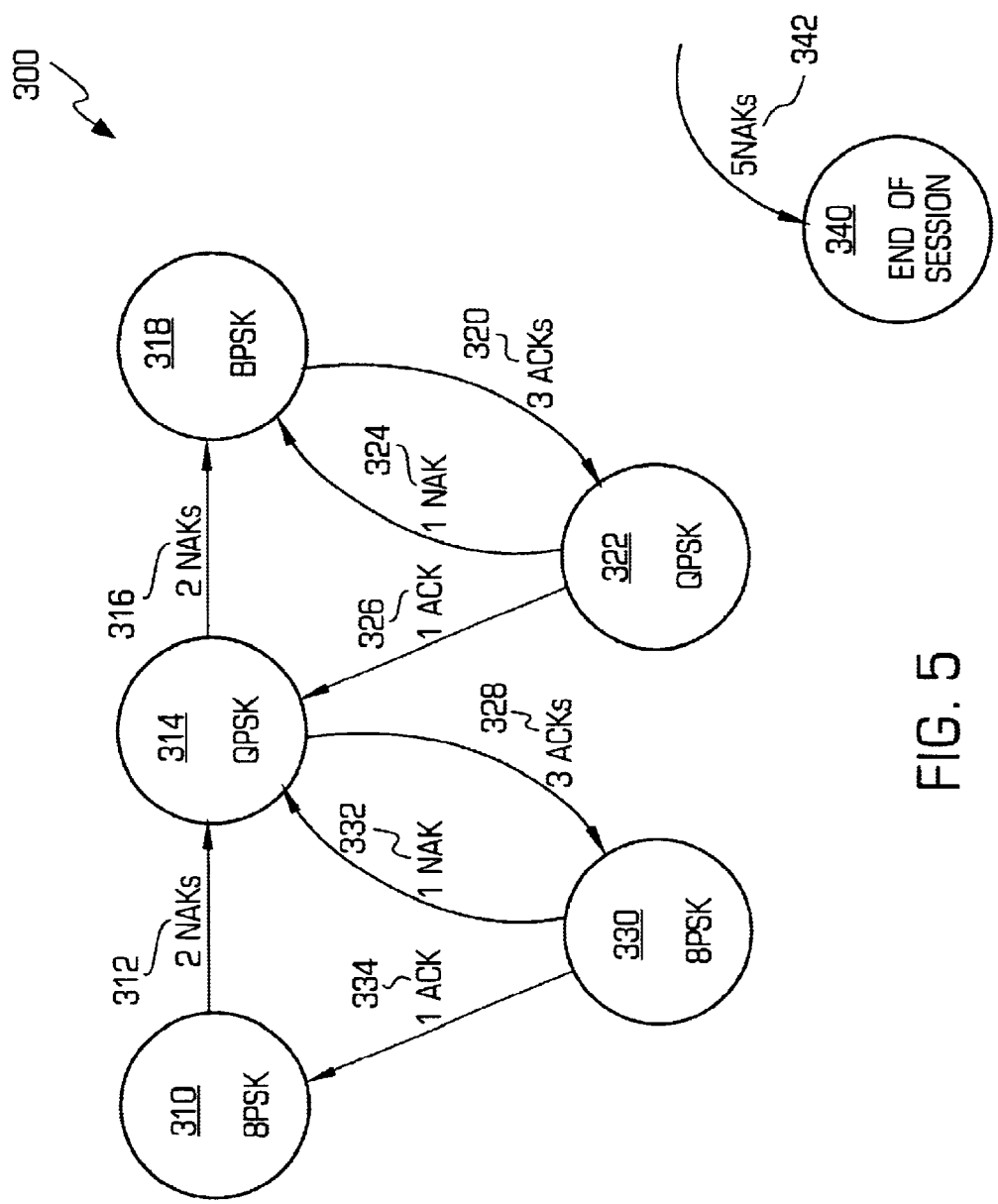
FIG. 5 illustrates a state machine used to optimize data throughput during data transmission by one embodiment of the present invention.

FIG. 5 illustrates a state machine showing how the bit rate may dynamically change during data transfer. During the data transfer stage, the remote device 110 may send data packets to the messaging server 130 and the messaging server 130 may send data packets to the remote device 110. For an illustration of the transitions for the state machine in FIG. 5, an example using data transfer from the remote device 110 to the messaging server 130 is used. Assuming that the remote device 110 is finished with the data connection phase and is in state 214 in FIG. 3 with 8PSK modulation at carrier frequency 1800 Hz, data transfer starts in state 310 in FIG. 4. As long the messaging server returns acknowledgments to the data packets sent by the remote device 110 at modulation 8PSK, we remain in state 310. If the remote device 110 receives two NAKs 312 from the messaging server 130, the state changes from 8PSK 310 to QPSK 314. This lowers the bit rate for transferring the data from the remote device 110 to the messaging server 130. If two NAKs 316 are again received by the remote device 110 for a data information item, the state machine transfers from QPSK 314 to BPSK 318. If in state 318 or any other state in the finite state machine of FIG. 4, five NAKs 342 are received in a row, we transition to state 340 which is the end of session. If in state BPSK 318, the remote device receives three ACKs 320 in a row, indicating successful transmission of three information data items from the remote device 110 to the messaging server 130, there is a transition from state BPSK 318 to QPSK state 322. This means that the bit rate is increased. If a NAK 324 is received when in state 322, the transition is back to BPSK state 318. If another ACK 326 is received, there is a transition from BPSK state 322 to QPSK state 314. In QPSK state 314, if three ACKs 328 are received in a row for three data items transferred, then there is a transition from QPSK state 314 to 8PSK state 330. If another ACK 334 is received, 8PSK state 330 transitions to 8PSK state 310. If a NAK 332 is received, the 8PSK state 330 transitions back to state QPSK 314. Thus, the modulation, and therefore the bit rate, is changed depending upon the acknowledgments and non-acknowledgments received by the remote device 110 from the messaging server 130. In another embodiment, the NAKs may be a combination of NAKs or timeouts. The number of ACKs and NAKs required to move from one state to another may change, and the number required in this figure are exemplary of one specific embodiment of the present invention.

As above, the telephone network frequency response and noise characteristics may change as a function of time. This state machine seeks to optimize the bit rate for data transfers by interactively changing the rate to the highest possible rate at a given time. It does so while at the same time limiting the amount of lost data which must be resent, thus improving the effective data throughput.

An example of a format of a data packet is given in Table 1:

TABLE 1

| tone | Alt | Sync | Rate | data |
| --- | --- | --- | --- | --- | where tone is pure carrier, alt is 180 degree phase reversals of the carrier, sync is the synchronization bits for the Digital Signal Processor (DSP), rate is a word which indicates 8PSK, QPSK, or BPSK, and the data format includes that given in U.S. patent application Ser. No. 09/219,109, filed Dec. 22, 1998, entitled "MESSAGING COMMUNICATION PROTOCOL," by Chen, et. al.

Embodiments of the present invention have been explained with reference to particular examples and figures. Other embodiments will be apparent to those of ordinary skill in the art. Therefore, it is not intended that this invention be limited except as indicated by the claims.

What is claimed is:

1. A method for establishing a connection between a server and a remote device over a communication network comprising:

sending a first setup information item by said remote device to said server using a first carrier frequency with a first narrow bandwidth;

if no acknowledgment is received by said wireless remote device for said first setup information item, sending a second setup information item by said wireless remote device using a second carrier frequency with a second narrow bandwidth; and when an acknowledgment is received, sending data by said wireless remote device to said server using a selected carrier frequency, wherein the selected carrier frequency is responsive to which setup information item is acknowledged.

2. The method of claim 1 wherein said first setup information item is sent over a highly compressed voice channel.

3. The method of claim 1 wherein said acknowledgment comprises a correctable acknowledgment information item.

4. The method of claim 1 wherein said no acknowledgment comprises a timeout by said remote device.

5. The method of claim 1 wherein said first narrow bandwidth and said second narrow bandwidth are the same.

6. The method of claim 5 wherein said first narrow bandwidth is about 500 Hertz.

7. The method of claim 1 wherein said first carrier frequency is about 1800 Hertz.

8. The method of claim 1 wherein said second carrier frequency is about 1000 Hertz.

9. A method for establishing a connection between a server and a wireless remote device over a communication network comprising:

sending a first setup information item by said wireless remote device to said server using a first modulation type and a first carrier frequency;

if no acknowledgment is received by said wireless remote device for said first setup information item, sending a second setup information item by said wireless remote device using a second modulation type and a first carrier frequency; and when an acknowledgment is received, sending data by said wireless remote device to said server using a selected modulation type and a selected carrier frequency, wherein said selected modulation type and said selected carrier frequency are responsive to which setup information item is acknowledged.

10. The method of claim 9 further comprising, if no acknowledgment is received by said wireless remote device for said first setup information item or said second setup information item, sending a third setup information item by said wireless remote device using a second carrier frequency and said second modulation type.

11. The method of claim 9 wherein said first modulation type is eight phase shift key (8PSK) modulation.

12. The method of claim 9 wherein said second modulation type is quadrature phase shift key (QPSK) modulation.

13. The method of claim 9 further comprising:
if no acknowledgment is received by said wireless remote device for said second setup information item, sending a third setup information item by said wireless remote device using a third modulation type and a first carrier frequency;
wherein said third modulation type is biphase shift key (BPSK) modulation.

14. A method for transferring data between a server and a wireless remote device over a communication network comprising:
sending a first data item by said wireless remote device to said server using a first modulation type;
if K non-acknowledgments are received by said wireless remote device for said first data item, sending said first data item by said wireless remote device to said server using a second modulation type, wherein K is an integer; and
when an acknowledgment is received, sending a second data item by said wireless remote device to said server using a selected modulation type, wherein said selected modulation type is responsive to which modulation type is used when said first data item is acknowledged.

15. The method of claim 14 wherein said first data item is sent over a highly compressed voice channel.

16. The method of claim 14 wherein the highly compressed voice channel comprises a digital wireless mobile phone.

17. The method of claim 14 wherein said first modulation type has a higher bit rate than said second modulation type.

18. The method of claim 14 wherein K equals 2.

19. The method of claim 14 wherein said first modulation type is 8PSK said second modulation type is QPSK.

20. The method of claim 14 wherein said first modulation type is QPSK said second modulation type is BPSK.

* * * * *